(12) United States Patent
Fallen-Bailey

(10) Patent No.: US 9,277,053 B2
(45) Date of Patent: Mar. 1, 2016

(54) READY-TO-DIAL GLOBAL PHONE NUMBERS

(75) Inventor: Timothy Fallen-Bailey, Virginia Beach, VA (US)

(73) Assignee: Oracle International Corporation, Redwood Shores, CA (US)

( * ) Notice: Subject to any disclaimer, the term of this patent is extended or adjusted under 35 U.S.C. 154(b) by 1410 days.

(21) Appl. No.: 12/263,209

(22) Filed: Oct. 31, 2008

(65) Prior Publication Data

US 2010/0111289 A1    May 6, 2010

(51) Int. Cl.
*H04M 3/493* (2006.01)
*H04M 3/42* (2006.01)

(52) U.S. Cl.
CPC ........ *H04M 3/4931* (2013.01); *H04M 3/42357* (2013.01); *H04Q 2213/1307* (2013.01); *H04Q 2213/13097* (2013.01); *H04Q 2213/13103* (2013.01); *H04Q 2213/13389* (2013.01)

(58) Field of Classification Search
None
See application file for complete search history.

(56) References Cited

U.S. PATENT DOCUMENTS

| | | | | |
|---|---|---|---|---|
| 5,559,862 | A * | 9/1996 | Bhagat et al. | 455/460 |
| 5,703,934 | A * | 12/1997 | Zicker et al. | 455/462 |
| 5,887,058 | A * | 3/1999 | Kammath et al. | 379/284 |
| 6,408,067 | B1 * | 6/2002 | Robinson | 379/355.08 |
| 6,963,640 | B1 * | 11/2005 | Manning | 379/355.08 |
| 7,016,343 | B1 * | 3/2006 | Mermel et al. | 370/356 |
| 7,062,034 | B2 * | 6/2006 | Gibbs et al. | 379/354 |
| 2001/0049738 | A1 * | 12/2001 | Doi | 709/228 |
| 2003/0100334 | A1 * | 5/2003 | Mazzara, Jr. | 455/552 |
| 2003/0231755 | A1 * | 12/2003 | Akhteruzzaman et al. | 379/218.01 |
| 2004/0052357 | A1 * | 3/2004 | Logan et al. | 379/355.04 |
| 2006/0002542 | A1 * | 1/2006 | Yamartino | 379/355.08 |
| 2006/0084414 | A1 * | 4/2006 | Alberth et al. | 455/414.1 |
| 2007/0025545 | A1 * | 2/2007 | Chen et al. | 379/355.08 |
| 2007/0064893 | A1 * | 3/2007 | Halpern et al. | 379/142.01 |
| 2007/0064919 | A1 * | 3/2007 | Chen et al. | 379/355.05 |
| 2007/0076687 | A1 * | 4/2007 | Low et al. | 370/351 |
| 2007/0274510 | A1 * | 11/2007 | Kalmstrom | 379/350 |
| 2008/0043718 | A1 * | 2/2008 | Chu | 370/352 |
| 2010/0166167 | A1 * | 7/2010 | Karimi-Cherkandi et al. | 379/201.05 |

\* cited by examiner

*Primary Examiner* — Fan Tsang
*Assistant Examiner* — Jeffrey Lytle
(74) *Attorney, Agent, or Firm* — Campbell Stephenson LLP

(57) ABSTRACT

A method, computer-readable medium, and apparatus for providing ready-to-dial global phone numbers is provided. In one embodiment of the present invention, a telephone number parser parses a received telephone number into a collection of telephone number components. The telephone number parser validates each telephone number component of the collection of telephone number components. A telephone number manager stores the collection of telephone number components. In response to receiving a request for a telephone number, a telephone number assembler generates the telephone number from the collection of telephone number components. The telephone number is configured to be successfully dialed from a location from which the telephone number is to be dialed. Finally, the telephone number manager displays the telephone number.

25 Claims, 8 Drawing Sheets

| Country Name 302 | Country Code 304 | Trunk Prefix 306 | International Access Code 308 | ISO Two-Letter ID 310 | ISO Three-Letter ID 312 |
|---|---|---|---|---|---|
| Afghanistan | 93 | 0 | 00 | AF | AFG |
| Albania | 355 | 0 | 00 | AL | ALB |
| Algeria | 213 | 0 | 00 | DZ | DZA |
| American Samoa | 1 | 1 | 011 | AS | ASM |
| Andorra | 376 | | 00 | AD | AND |
| Angola | 244 | 0 | 00 | AO | AGO |
| ... | ... | ... | ... | ... | ... |
| USA | 1 | 1 | 011 | US | USA |
| ... | ... | ... | ... | ... | ... |

Metadata database 300

| Contact ID 350 | Country ID 352 | Phone Type 354 | Area Code 356 | Subscriber Number 358 | Extension 360 |
|---|---|---|---|---|---|
| User 1 | USA | Landline | 650 | 5551234 | <null> |
| User 2 | Canada | Mobile | 416 | 5555678 | <null> |
| ... | ... | ... | ... | ... | ... |
| User N | United Kingdom | Fax | 734 | 25559012 | 241 |

Telephone number database 338

*Fig. 3B*

Telephone Number Entry 380

Enter Telephone Number

◯ Landline  ◯ Mobile Phone  ◯ Fax

*Fig. 3C*

READY-TO-DIAL GLOBAL PHONE NUMBERS

BACKGROUND

Telephone numbers can be expressed as a local number, a long distance number, or as an international number. When telephone numbers are entered into a computer system, such telephone numbers need not be "dialable numbers" (i.e., telephone numbers that enable a caller to successfully connect to the purported destination associated with the telephone number). However, in the context of a customer relations management (CRM) system, for example, telephone numbers stored in such a CRM system should enable a caller to be successfully connected to the party (e.g., a customer or employee) associated with the telephone number, without the need for the caller to manipulate the telephone number.

Some computer systems (e.g., CRM systems) store millions to tens-of-millions of telephone numbers. Of course, not all of these numbers are entered into the computer system (e.g., a CRM database) by a single person, a single group of people, or even at a single location. Thus, these telephone numbers may be entered in many different formats. For example, various users will employ different delimiters (e.g., periods, hyphens, parenthesis) to separate the different parts of a telephone number.

Not only will these telephone numbers be entered in different formats, a large percentage of them may be incorrect (due to user entry errors or other errors) or incomplete (missing certain information necessary to enable the telephone number to be dialed from certain locations).

Also, there is typically a large gap (temporally and geographically) between the entry of a telephone number and the actual use of a telephone number. For example, a telephone number might be entered into a computer system by a first user in the United States. Days, weeks, months, or even years later, a second user in France may retrieve the telephone number from the computer system and try to dial the telephone number. If the telephone number is incorrect, the first user may not be reachable in order to provide a correct telephone number.

In the field of computer integrated telephony (e.g., digital private branch exchange (PBX)), some digital PBX systems attempt to verify telephone numbers in a database to ensure that the telephone numbers are dialable. However, among other infirmities these systems perform such verification after the telephone numbers are entered into the database, at a point when the person that entered the telephone number is unavailable.

It is appreciated that "telephone number normalization" is sometimes employed to introduce a consistent format in which telephone numbers are expressed. Telephone number normalization is the translation of telephone numbers that are entered in various formats into a single standard format. One example of telephone normalization is the "international common format." However, in addition to the aforementioned difficulties, the mere fact that a telephone number is formatted according to a telephone number normalization rule does not make the telephone number automatically dialable from a given geographic location. A caller from a particular location may need to add digits to, or subtract digits from or otherwise reformat a telephone number to successfully connect to the destination associated with the telephone number. In this regard, many people do not know or fail to understand how to dial telephone numbers outside of their region to enable successful connections. These various issues, combined with the sheer number of telephone numbers often stored in telephone number databases, present a formidable challenge to the computer system's users to actually be successfully connected to the party associated with a given telephone number. Thus, there is a need for a more effective and reliable system for storing and accessing telephone numbers in computer systems.

SUMMARY

Embodiments of the present invention include a method, computer-readable medium, and apparatus for providing ready-to-dial global phone numbers. In one embodiment of the present invention, a telephone number parser parses a received telephone number into a collection of telephone number components. The telephone number parser validates each telephone number component of the collection of telephone number components. A telephone number manager stores the collection of telephone number components. In response to receiving a request for a telephone number, a telephone number assembler generates the telephone number from the collection of telephone number components. The telephone number is configured to be successfully dialed from a location from which the telephone number is to be dialed. Finally, the telephone number manager displays the telephone number.

The foregoing is a summary and thus contains, by necessity, simplifications, generalizations and omissions of details; consequently, those skilled in the art will appreciate that the summary is illustrative only and is not intended to be in anyway limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description below.

BRIEF DESCRIPTION OF THE DRAWINGS

The present invention may be better understood, and its numerous objects, features and advantages made apparent to those skilled in the art by referencing the accompanying drawings.

FIG. 3B is an example of a telephone number database.

FIG. 3C is an example of a telephone number entry screen.

DETAILED DESCRIPTION

Introduction

Figure 1:
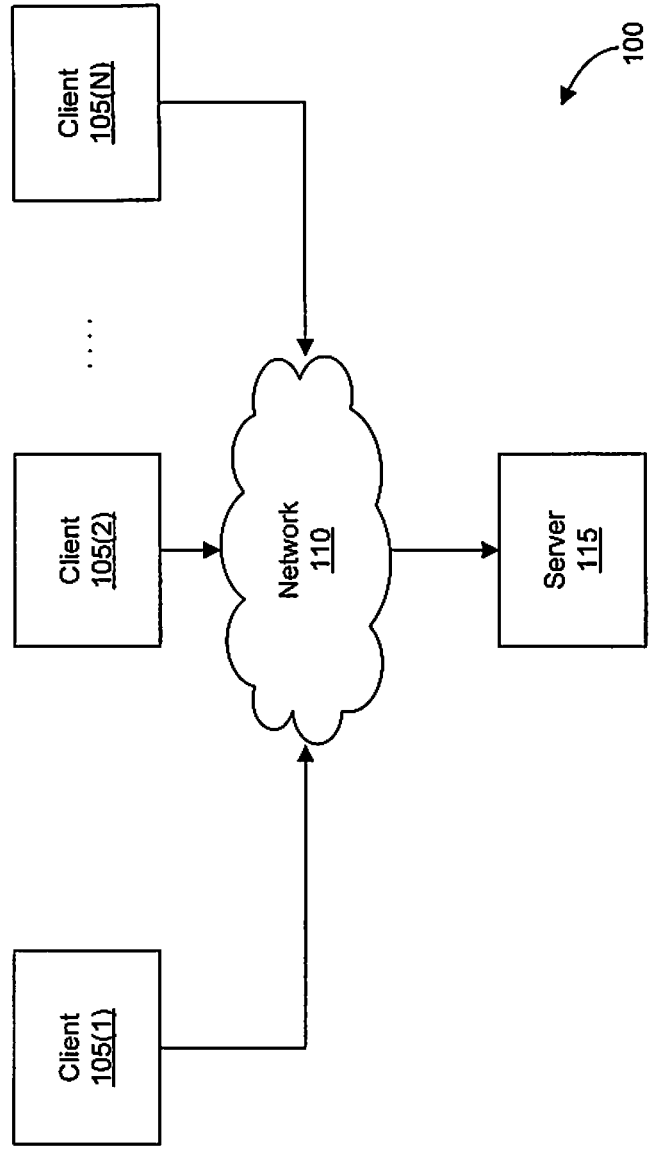
FIG. 1 is a simplified block diagram illustrating an example of a network architecture in which one or more clients have network access to a server.

Embodiments of the present invention provide for the receipt, parsing, validation, and generation of telephone numbers. As will be appreciated, embodiments of the present invention decompose a received telephone number into a collection of telephone number components. Upon receipt of a request for a telephone number, embodiments of the present invention re-assemble the telephone number from the collection of telephone number components, while considering the geographic location from which the request originated.

According to embodiments of the present invention, a telephone number manager on a server, for example, receives a telephone number from a client. According to other embodiments of the present invention, the telephone number manager coordinates the batch processing of a collection of telephone numbers from, for example, an imported telephone number database from a computer system located in a different geographic region. A telephone number parser scans the telephone number to determine the overall format (i.e., whether the received telephone number is a local, long distance, or international number). Once the telephone number parser determines the overall format of the telephone number, the telephone number parser decodes the telephone number by identifying a collection of telephone number components. The telephone number parser stores the collection of telephone number components within a database. According to alternative embodiments of the present invention, a user can verify the telephone number for accuracy. In other embodiments of the present invention, the telephone number manager can validate the collection of telephone number components. The telephone number manager performs such validation by comparing the collection of telephone number components with a table of known telephone number components for each country and/or city. According to some embodiments of the present invention, this table is implemented as a metadata database.

The server also services requests for "ready-to-dial" telephone numbers from clients. A "ready-to-dial" telephone number is a telephone number that is formatted such that a caller located at the requesting client's geographical location can dial the "ready-to-dial" telephone number and be successfully connected. Upon receiving a request for a ready-to-dial telephone number from a client, the telephone number manager retrieves the client's geographic location. According to other embodiments of the present invention, the client can specify (e.g., within the request) a particular geographic location that is different from the client's geographic location. The telephone number manager determines a target location of the requested ready-to-dial telephone number. A telephone number assembler adds necessary codes to assemble the ready-to-dial telephone number. The telephone number manager presents the ready-to-dial telephone number to the client.

According to some embodiments of the present invention, the telephone number manager can present the ready-to-dial telephone number to the client in a variety of ways. The presentation of the ready-to-dial telephone number includes, but is not limited to: displaying the ready-to-dial telephone number, automatically dialing the ready-to-dial telephone number, and/or sending the ready-to-dial number to a remote location via e-mail, short message service (SMS), instant messaging (IM) service, or any other type of messaging service.

According to some embodiments of the present invention, upon client request, the telephone number manager can incorporate dialing codes into the ready-to-dial telephone number, such as dialing codes for specifying a long distance provider into the ready-to-dial telephone number. For example, a client may request that the telephone number manager preface the ready-to-dial telephone number with a "1010-xxx" code, wherein the "xxx" is a three-digit long distance provider identification code.

Telephone Number Components

As described herein in greater detail, embodiments of the present invention identify a collection of telephone number components within the telephone numbers received from a client or from an imported telephone number database. These telephone number components can include, but are not limited to:

Country Code (CC): Generally, a country code is an alphabetic or numeric geographical code that represents a particular country, Standard country code systems that can be used by embodiments of the present invention include, but are not limited to: ISO 3166-1 alpha 2 (two-letters), ISO 3166-1 alpha 3 (three-letters), and the E.164 country calling codes system.

Trunk Prefix (TP): Trunk prefixes are one or more digits that are normally needed to dial a telephone number domestically (i.e., within the same country). Trunk prefixes are typically not necessary to dial local telephone numbers (i.e., telephone numbers within the same area code). For example, in the United States of America, the trunk prefix is "1" (e.g., 1-323-555-7234), but in other countries, the trunk prefix is "0". A trunk prefix is not used in all countries.

Area Code (AC) and Subscriber Number (SN): An area code identifies a particular region within a country. Several countries have area codes ranging between 2-5 digits and subscriber numbers ranging between 5-8 digits. According to some embodiments of the present invention, an area code can be identified by delimiters that separate the area code from a subscriber number. A delimiter can be any of a number of characters and may include delimiters such as parenthesis, dashes, and/or spaces. For example, some area code/subscriber number combinations can be represented as: (323) 555-7234, 323-555-7234, 323 555 7234. A subscriber number is a telephone number that is assigned to a particular subscriber within a region defined by an area code.

Extension (EXT): The extension number enables a single subscriber number to be distributed among multiple users. According to an embodiment of the present invention, an extension number can be identified in a telephone number if there is an extension delimiter separating the extension from the subscriber number. An extension delimiter can be implemented by any predetermined character.

International Access Code (IAC): An International Access Code is a group of digits a user (or computer) dials to indicate that the telephone number being dialed is in a different country. For the United States, the International Access Code is "011", but in many other countries in the world, the International Access Code is "00". For example, assuming that a user in the United States has the telephone number (123) 456-7890 and a user in the United Kingdom has the telephone number 987 654 321, the user in the United States would dial "011 44 987 654 321" to reach the user in the United Kingdom. The user in the United Kingdom would dial "00 1 123 456 7890" to reach the user in the United States.

Validation Rules

Embodiments of the present invention use the following concepts for storing and generating ready-to-dial telephone numbers:

(1) If there are enough digits to dial a telephone number for a given country, the telephone number is accepted and stored according to parsing and validation rules dictated by a telephone number parser, which is discussed herein in greater detail.

(2) If there are not enough digits to dial the telephone number for a given country:

(a) In an online mode (where a user is submitting the telephone number via a client to a server), the telephone number is rejected and the user is given an appropriate error message. The user can then re-enter a telephone number to correct the error indicated in the error message. Embodiments of the present invention, especially in online mode, enable real-time verification of telephone numbers while the user entering the telephone number is present. Real-time verification helps reduce the number of incorrect telephone numbers that cannot be verified at a later date because the user entering the telephone number may be unavailable or unreachable at the later date;

(b) In batch mode (where a batch of telephone numbers from (for example) an imported telephone number database is processed at one time):

(i) If the telephone numbers are successfully parsed and validated, the telephone numbers are accepted and log entries recording the operation are generated.

(ii) If the telephone numbers are not successfully parsed or validated, the telephone number is accepted, but a flag indicating that the telephone number may not be valid is set.

(iii) In either case (i) or case (ii), if the telephone number later shows up in online mode, the telephone number is subject to the validation concepts of the online mode.

Parsing (Inbound), Validation and Storage

According to some embodiments of the present invention, a key piece of information on which the abovementioned validation is based is the country code. A primary goal of some embodiments of the present invention (e.g., systems intended for user by multi-national businesses) is to ensure that many of the stored telephone numbers have an associated country code. Parsing of telephone numbers is still performed to identify and validate other telephone number components, if possible. To assist in parsing of telephone numbers, metadata is provided in a database resident in, for example, a server storage device. Some embodiments of the present invention parse any given telephone number without any prior knowledge of the source of the telephone number.

When parsing a received telephone number, some embodiments of the present invention validate the abovementioned international code, country code, and city codes by accessing a metadata database of such codes. Validating a subscriber number involves ensuring that the subscriber number meets certain number length requirements. The subscriber number length requirements vary depending on the country from which the telephone number is located. For example, in the United States of America, the subscriber number length requirement is seven numbers (e.g., 555-1234). An extension can be validated by an extension number length check as well. A system administrator can specify a specific length for extension number validations. In other embodiments of the present invention, an extension can be identified if there is a delimiter (e.g., a space, hyphen, or other predefined character) separating the extension from the subscriber number. Because the time (and geographical distance) between the entering of and retrieving of a telephone number can be great, validation upon entry, at the time when the person entering the telephone number is accessible, facilitates increased accuracy of the telephone numbers stored in the database.

Request Processing

According to some embodiments of the present invention, a client (which can be implemented as a client computer, software on a client computer, such as a browser, or a user accessing a server via a client computer) sends a request for a ready-to-dial telephone number to a server. A telephone number manager (on the server, for example) receives the request from the client and retrieves location information associated with the client that submitted the request. A telephone number assembler then determines if the ready-to-dial telephone number should be formatted as a local, trunk, or international call. The telephone number assembler retrieves telephone number components from the telephone number database, assembles the requested ready-to-dial telephone number, and the telephone number manager presents the ready-to-dial telephone number to the client.

Batch Processing

According to other embodiments of the present invention, batch processing of a collection of telephone numbers can be implemented. A first telephone number database from a first region can be imported to a second telephone number database stored on a computer system located in a second region. The first and second regions can be located in different cities, area codes, states, or even countries. Batch processing enables the import of a first telephone number database containing telephone numbers that may not be validated, into a second telephone number database.

For example, a first telephone number database from a CRM system located in the United States of America might be imported into a second telephone number database stored on a CRM system used by a call center located in India. The telephone numbers stored in the first telephone number database are likely formatted according to a variety of formats, given that these telephone numbers were likely entered by many different individuals. These telephone numbers would not be immediately "ready-to-dial," particularly from another location such as India. Embodiments of the present invention can import the first telephone number database, batch process the telephone numbers in that database to generate a collection of telephone number components, and import the telephone number components into the second telephone number database. Upon request from a user located in India, the imported telephone number components can be reassembled by a telephone number assembler and various codes can be added to the telephone number components to generate a "ready-to-dial" telephone number from the user's location in India.

Online Mode Processing

According to other embodiments of the present invention, real-time validation and processing of telephone numbers can be implemented. A single telephone number database, containing validated telephone number components, can be accessed remotely by users in a number of locations. The users can enter telephone numbers to the telephone number database and a telephone number parser located on the server validates the telephone number upon entry. Either batch processing (as previously discussed) or online mode processing allows real-time validation of telephone numbers. The telephone number parser parses the telephone number into telephone number components. Later, the telephone number components can be accessed from any location (e.g., foreign call centers, smart phones, and so on), and a "ready-to-dial" telephone number is provided. The telephone number database is thus accessed from any number of such locations and a telephone number assembler reassembles ready-to-dial telephone numbers for those locations upon request.

An Example Architecture of Telephone Number Management

FIG. 1 is a simplified block diagram illustrating a network architecture 100 in which one or more clients are provided with access to a server via various network connections. As depicted in FIG. 1, clients 105(1)-105(N) are coupled to a network 110, and so are able to access a server 115 via network 110. A client can be implemented using, for example, a desktop computer, a laptop computer, a workstation, a server, a cell phone, a smart phone, a network-enabled personal digital assistant, PDA or the like. An example of network 110, which can be used by clients 105(1)-105(N) to access server 115, is the Internet. Alternatively, access to server 115 can be provided by a local area network (LAN) utilizing Ethernet, IEEE 802.11x, or some other communications protocol. As will be appreciated, server 115 can be accessed by clients coupled directly thereto (not shown). Those of skill in the art will further appreciate that example network 100 may include other components such as routers, firewalls and the like that are not germane to the discussion of the present network and will not be discussed further herein.

Figure 2:
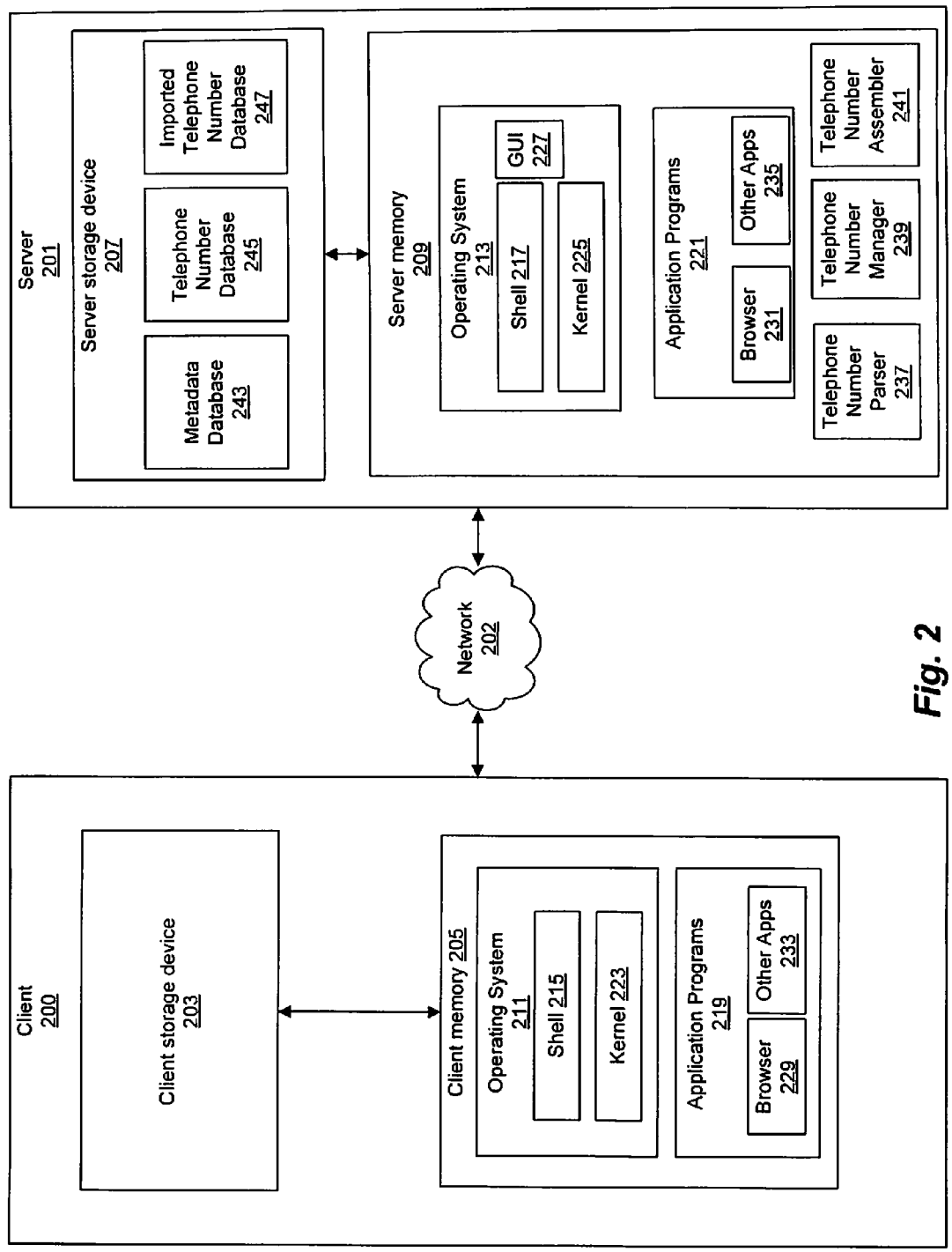
FIG. 2 is a simplified block diagram that depicts an example relationship between a client and a server.

FIG. 2 is a simplified block diagram that depicts an example relationship between a client and a server. As illustrated, a client 200 (which can be utilized to implement clients 105(1)-105(N) of FIG. 1) is coupled to a server 201 (which can be utilized to implement server 115 of FIG. 1) via a network 202 (which can be utilized to implement network 110 of FIG. 1). Client 200 is further includes a client storage device 203 and a client memory 205. Server 201 further includes a server storage device 207 and a server memory 209.

Client memory 205 and server memory 209 have resident therein operating systems 211 and 213, which further include shells 215 and 217 (as referred to in the UNIX® operating system) for providing transparent user access to resources such as application programs 219 and 221. Generally, shells 215 and 217, also referred to as command processors in the Microsoft® Windows® operating system, are generally the highest level of the operating system hierarchy and serve as command interpreters. Shells 215 and 217 provide system prompts, interpret commands (e.g., entered by keyboard, mouse or other input media), and send the interpreted commands to the appropriate lower levels of the operating system (e.g., kernels 223 and 225) for processing. Note that while shells 215 and 217 are depicted as text-based, line-oriented user interfaces, embodiments of the present invention support other user interface modes, such as graphical (e.g., a graphical user interface (GUI) 227), voice, gestural and the like.

As depicted, operating systems 211 and 213 also include kernels 223 and 225, which include functionality for the lower levels of operating systems 211 and 213, as well as application programs 219 and 221, Such lower levels include memory management, process and task management, disk management, and mouse and keyboard management. Application programs 219 and 221 also include browsers 229 and 231, used to access network 202, word processors (not pictured), spreadsheets (also not pictured), and other application programs 233 and 235.

Server memory 209 also maintains a telephone number parser 237, a telephone number manager 239, a telephone number assembler 241, all of which are discussed herein in greater detail. Server storage device 207 includes a metadata database 243 and a telephone number database 245 for storing parsed telephone number components. According to some embodiments of the present invention, an imported telephone number database 247 can be included in server storage device 207. Imported telephone number database 247 can include telephone numbers from a different computer system. Some embodiments of the present invention implement batch processing of telephone numbers from an imported telephone number database (e.g., imported telephone number database 247) to parse and validate the imported telephone numbers as discussed herein in greater detail in conjunction with FIGS. 4A and 4B.

According to embodiments of the present invention, telephone number manager 239 receives a telephone number from a client (e.g., client 200). Telephone number manager 239 forwards the telephone number to telephone number parser 237. Telephone number parser 237 scans the telephone number to determine the overall format (i.e., whether the received telephone number is a local, long distance, or international number). Once telephone number parser 237 determines the overall format of the telephone number, telephone number parser 237 decodes the telephone number by identifying a collection of telephone number components. Telephone number parser 237 stores the collection of telephone number components within a database (e.g., telephone number database 245). According to alternative embodiments of the present invention, a user can verify the decoded telephone number. In other embodiments of the present invention, telephone number manager 239 can validate the decoded collection of telephone number components. Telephone number manager 239 performs such validation by comparing the collection of telephone number components with a table of known telephone number components (e.g., metadata database 243) for each country.

Server 201 also services requests for "ready-to-dial" telephone numbers from clients. A "ready-to-dial" telephone number is a telephone number that is formatted such that a caller located at the requesting client's geographical location can dial the "ready-to-dial" telephone number and will be successfully connected. Upon receiving a request for a ready-to-dial telephone number from a client, telephone number manager 239 retrieves the client's geographic location. According to other embodiments of the present invention, the client can specify within the request a particular geographic location (which may be that is different from the client's geographic location). Telephone number manager 239 determines a target location of the requested ready-to-dial telephone number and telephone number assembler 241 adds necessary codes to assemble the ready-to-dial telephone number. Telephone number manager 239 then presents the ready-to-dial number to the client.

Figure 3A:
FIG. 3A is an example of a metadata database.

FIG. 3A is an example of a metadata database. Metadata database 300 (which can be use to implement metadata database 243 of FIG. 2) includes multiple columns: a country name column 302, a country code column 304, a trunk prefix column 306, an international access code column 308, an ISO Two-Letter ID column 410, and an ISO Three-Letter ID column 412. It will be appreciated that metadata database 300 is not limited to the metadata and categories of metadata (as shown by columns 302, 304, 306, 308, 310, and 312) illustrated in FIG. 3A, but may include other types of metadata and metadata categories.

FIG. 3B is an example of a telephone number database. Telephone number database 348 (which can be used to implement telephone number database 245) includes multiple columns including a contact identification column 350, a country identifier column 352, a telephone type column 354, an area code column 356, a subscriber number column 358, and an extension column 360. As discussed herein in greater detail in conjunction with FIGS. 4A and 4B, telephone number database 348 stores a collection of telephone number components identified in a telephone number received from a client (or an imported telephone number database, in the case of a batch processing job). Contact identification column 350 stores a user identifier associated with the corresponding telephone number. Country identification column 352 stores an identifier indicating a country in which the user is located. Telephone type column 354 identifies the type of service (e.g., landline, mobile, fax and the like) associated with the corresponding telephone number. Area code column 356, subscriber number column 358, and extension column 360 store the area code, subscriber number, and extension (if any) parsed from a telephone number received from a client or an imported telephone number database, for example.

FIG. 3C is an example of a telephone number entry dialog box. Telephone number entry dialog box 380 can be displayed on a display coupled to a client (e.g., client 200 of FIG. 2) by a graphical user interface (e.g., GUI 227 of FIG. 2). As illustrated, telephone number entry dialog box 380 includes a single number entry field and radio buttons to enable a user to indicate if the entered telephone number is a landline, mobile, or fax number. Such indication enables a user to distinguish between the telephone numbers. For example, a user would not attempt to send a fax transmission to a telephone number clearly indicated as a landline or mobile telephone number. It is appreciated that other types of user interfaces with other numbers of entry fields and interface elements can be utilized to implement embodiments of the present invention.

Figure 4A:
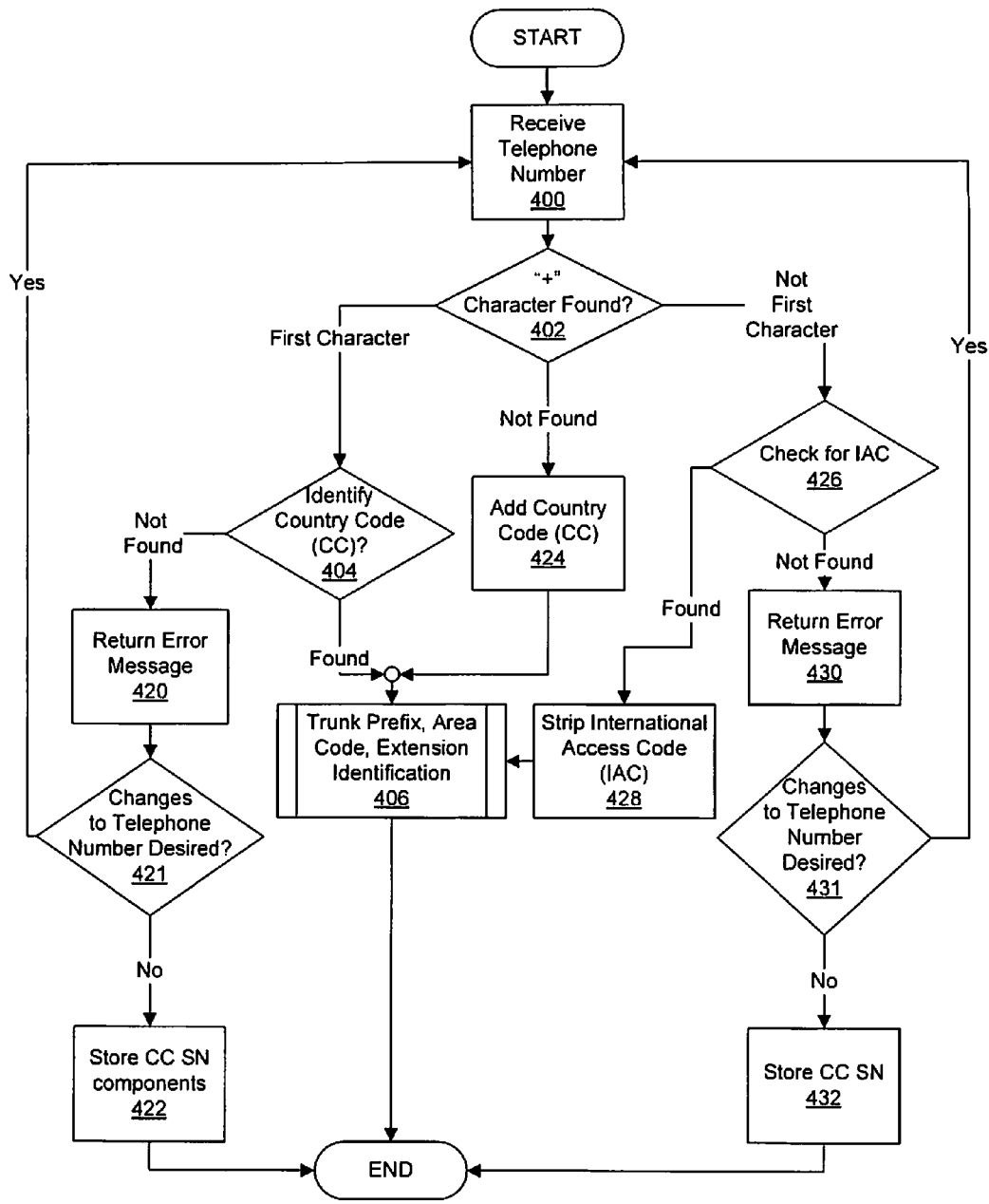
FIG. 4A is a simplified flow diagram illustrating an example of operations carried out by a server in parsing a telephone number.

FIG. 4A is a simplified flow diagram illustrating an example of operations carried out by a server in parsing a telephone number. The process begins with a telephone number manager (e.g., telephone number manager 239 of FIG. 2) receiving a telephone number from a client (e.g., client 200), for example (step 400). The telephone number manager forwards the telephone number to a telephone number parser (e.g., telephone number parser 237), which parses the telephone number for a "+" character (step 402). If the telephone number parser determines that the "+" character is the first character in the telephone number, the telephone number parser determining if a country code (CC) can be identified in the telephone number (step 404). According to an embodiment of the present invention, the telephone number parser identifies the country code (CC) in the telephone number by comparing digits following the "+" character with a list of country codes in a metadata database (e.g., metadata database 243). If a country code (CC) can be identified, the telephone number parser performs the trunk prefix, area code, and extension identification process (step 406). The process then ends.

Returning to step 404, if the telephone number parser cannot identify a country code (CC), the telephone number parser returns an error message to the telephone number manager (step 420). According to some embodiments of the present invention the telephone number manager forwards the error message to the client, which then prompts the client to re-enter the telephone number, for example (step 421). The re-entry request supports real-time validation of the telephone numbers since the client is readily available to make any corrections for telephone numbers that fail the telephone number manager's validation rules. If the client indicates a desire to re-enter the telephone number, the process returns to step 400. If not, the telephone number manager then stores the CC and SN telephone number components in the telephone number database (step 422). The process then ends.

Returning to step 402, if the "+" character is not found, the telephone number parser adds a country code (CC) of the client's location to the telephone number. According to an embodiment of the present invention, the telephone number parser can look up the country code (CC) of the client's location from the metadata database. The telephone number parser then performs the trunk prefix, area code, and extension identification process (step 406). The process then ends.

Returning once again to step 402, if the "+" character is found in the telephone number received, but is not the first character in the telephone number, the telephone number parser checks the telephone number for a recognizable international access code (IAC) (step 426). According to an embodiment of the present invention, the telephone parser identifies the international access code (IAC) in the telephone number by comparing digits following the "+" character with a list of known international access codes (IAC) in the metadata database. If an international access code (IAC) is found in the telephone number, the telephone number parser strips the telephone number of the international access code (IAC) (step 428). The telephone number parser then performs the trunk prefix, area code, and extension identification process (step 406). The process then ends.

Returning to step 426, if the telephone number parser does not find an international access code (IAC) in the telephone number, the telephone number parser returns an error message (step 430). According to some embodiments of the present invention the telephone number manager forwards the error message to the client, which prompts the client to re-enter the telephone number, for example (step 431). The re-entry request supports real-time validation of the telephone numbers since the client is readily available to make any corrections for telephone numbers that fail the telephone number manager's validation rules. If the client indicates a desire to re-enter the telephone number, the process returns to step 400. If not, the telephone number manager then stores the CC and SN telephone number components in the telephone number database (step 432). The process then ends.

Figure 4B:
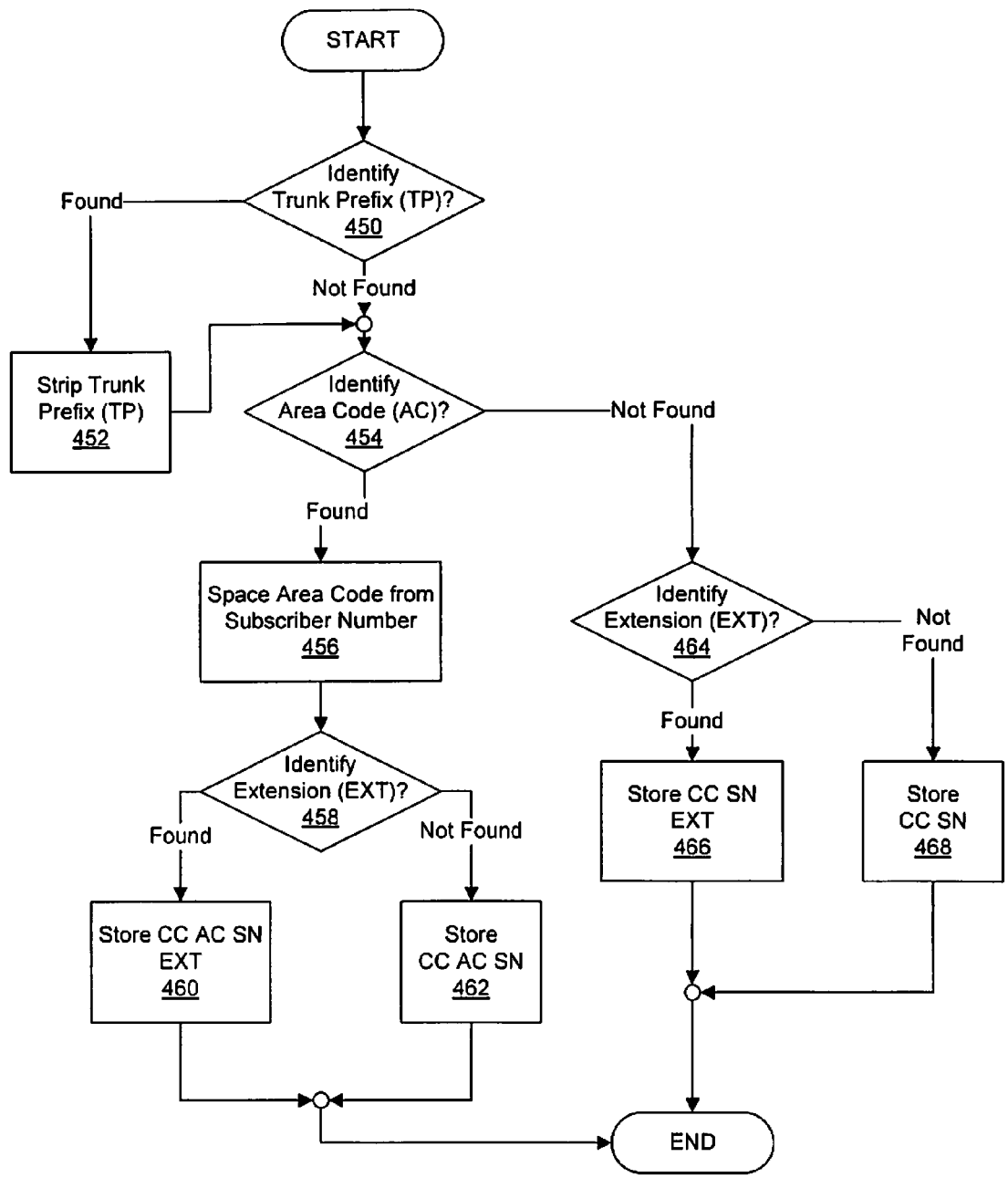
FIG. 4B is a simplified flow diagram depicting an example of trunk prefix, area code, and extension identification operations carried out by a server.

FIG. 4B is a simplified flow diagram depicting an example of trunk prefix, area code, and extension identification operations carried out by a server. The process begins with the telephone number parser determining if a trunk prefix (TP) can be identified from the telephone number (step 450). If a trunk prefix (TP) is found, the telephone number parser strips the trunk prefix from the telephone number (step 452). According to an embodiment of the present invention, the telephone parser identifies the trunk prefix (TP) in the telephone number by comparing digits in the telephone number with a list of known trunk prefixes (TP) in the metadata database. If, however, a trunk prefix (TP) is not found, the telephone number parser determines if an area code (AC) can be identified from the telephone number (step 454). If an area code (AC) can be found, the telephone number parser separates the area code (AC) from the rest of the phone number, which the telephone number parser presumes is the subscriber number (step 456). The process then proceeds to step 458, which illustrates the telephone number parser determining if an extension can be found in the telephone number. If an extension (EXT) is found, the telephone number parser stores the CC, AC, SN and EXT telephone number components in the telephone number database (step 460). If an extension (EXT) is not found, the telephone number parser stores the telephone number in the CC, AC and SN telephone number components in the telephone number database (step 462). The process then ends.

Returning to step 454, if the telephone number parser does not find an area code (AC), the telephone number parser attempts to identify an extension (EXT) (step 464). If an extension (EXT) if found, the telephone number parser stores the CC, SN and EXT telephone number components in the telephone number database (step 466). The process then ends. Returning to step 464, if an extension (EXT) is not found, the telephone number parser stores the CC and SN telephone number components in the telephone number database (step 468). The process then ends.

According to alternate embodiments of the present invention, the telephone number components can be validated by the telephone number manager. For example, the telephone number manager validates the identified country code component by comparing the identified country code against a list of country codes (e.g., country code column 304 within metadata database 300 of FIG. 3A).

The telephone number manager can validate the area code, for example, by:
(1) determining that the area code includes only numbers;
(2) checking that the area code length is greater than or equal to a first predetermined minimum length and less than or equal to a first predetermined maximum length; and
(3) checking the area code using a table of area codes for a country identified by the country code.

The subscriber number can be validated, for example, by:
(1) checking that the subscriber number only includes numbers, letters, and valid delimiters; and
(2) checking that the subscriber number length is greater than or equal to a second predetermined minimum length and less than or equal to a second predetermined maximum length. The extension, if any, can also be validated by determining if the extension is greater than or equal to a third predetermined minimum length and less than or equal to a third predetermined maximum length.

Figure 5:
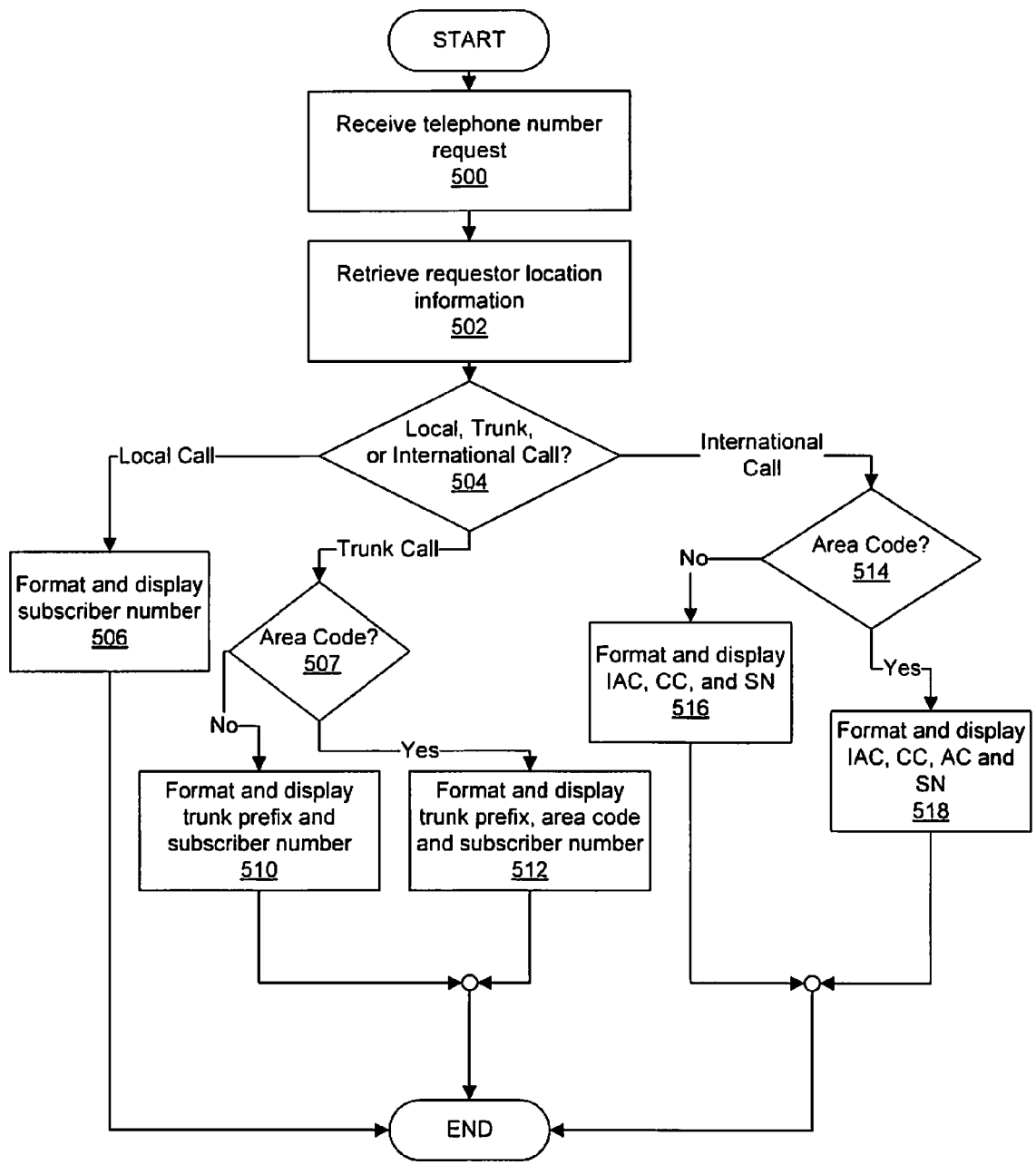
FIG. 5 is a simplified flow diagram illustrating an example of operations carried out by a server in servicing a telephone number request.

FIG. 5 is a simplified flow diagram depicting an example of a telephone number assembly operation carried out by the server. The process begins with the telephone number manager receiving a telephone number request from a client (step 500). According to some embodiments of the present invention, the telephone number manager can determine the geographic location of the requested telephone number by accessing the country ID column (e.g., country ID column 352 of FIG. 3B) and the area code column (e.g., area code column 356 of FIG. 3B) of telephone number database (e.g., telephone number database 348 of FIG. 3B). The telephone number manager retrieves a present geographic location of the requesting client (step 502). Those of skill in the art will appreciate that the present location of the requesting client can be determined in a variety of ways including, but not limited to: accessing a client profile that includes location information, Internet Protocol (IP) address tracking, use of global positioning system (GPS) data, or other location methods. Now that the telephone number manager is aware of the requesting client's geographic location and the geographic location of the requested telephone number, a telephone number assembler (e.g., telephone number assembler 241 of FIG. 2) can determine if a call to the requested number from the requesting client's geographic location is a local, trunk, or international call (step 504). If the call is a local call, the telephone number assembler formats and the telephone number manager presents the subscriber number component of the requested telephone number from the subscriber number column (e.g., subscriber number column 358) from the telephone number database (step 506). The process then ends.

If the telephone number manager determines that the call is a trunk call (e.g., a call outside of the requesting client's current area code, but within the same country as the client), the telephone number assembler determines whether or not the area code component of the requested telephone number is stored in the telephone number database (step 507). If not, the telephone number assembler formats and the telephone number manager displays the trunk prefix from the trunk prefix column (e.g., trunk prefix column of FIG. 3A) of a metadata database (e.g., metadata database 300 of FIG. 3A) and the subscriber number telephone number components of the requested telephone number (step 510). The process then ends.

Returning to step 507, if the telephone number manager determines that the area code component of the requested telephone number is stored in the telephone number database, the telephone number assembler formats and displays the trunk prefix, area code, and subscriber number components of the requested telephone number (step 512). The process then ends.

Returning to step 504, if the telephone number manager determines that the call is an international call, the telephone number assembler determines whether or not the area code component of the requested telephone number is stored in the telephone number database (step 514). If an area code component is not available, the telephone number assembler formats and displays an international access code (IAC) from the international access code column (e.g., international access code column 308 of FIG. 3A) of the metadata database, a country code (CC) from the country code column (e.g., country code column 304 of FIG. 3A) of the metadata database, and the subscriber number (SN) telephone number components of the requested telephone number (step 510). The process then ends.

Returning to step 514, if the telephone number manager determines that the area code component of the requested telephone number is stored in the telephone number database, the telephone number assembler formats and displays the international access code (IAC), country code (CC), area code (AC), and subscriber number (SN) components of the requested telephone number (step 518). The process then ends.

An Example Computing Environment

Elements of network architecture 100 can be implemented using a variety of computer systems and networks. And example of one such computing environment is described below with reference to FIG. 6.

Figure 6:
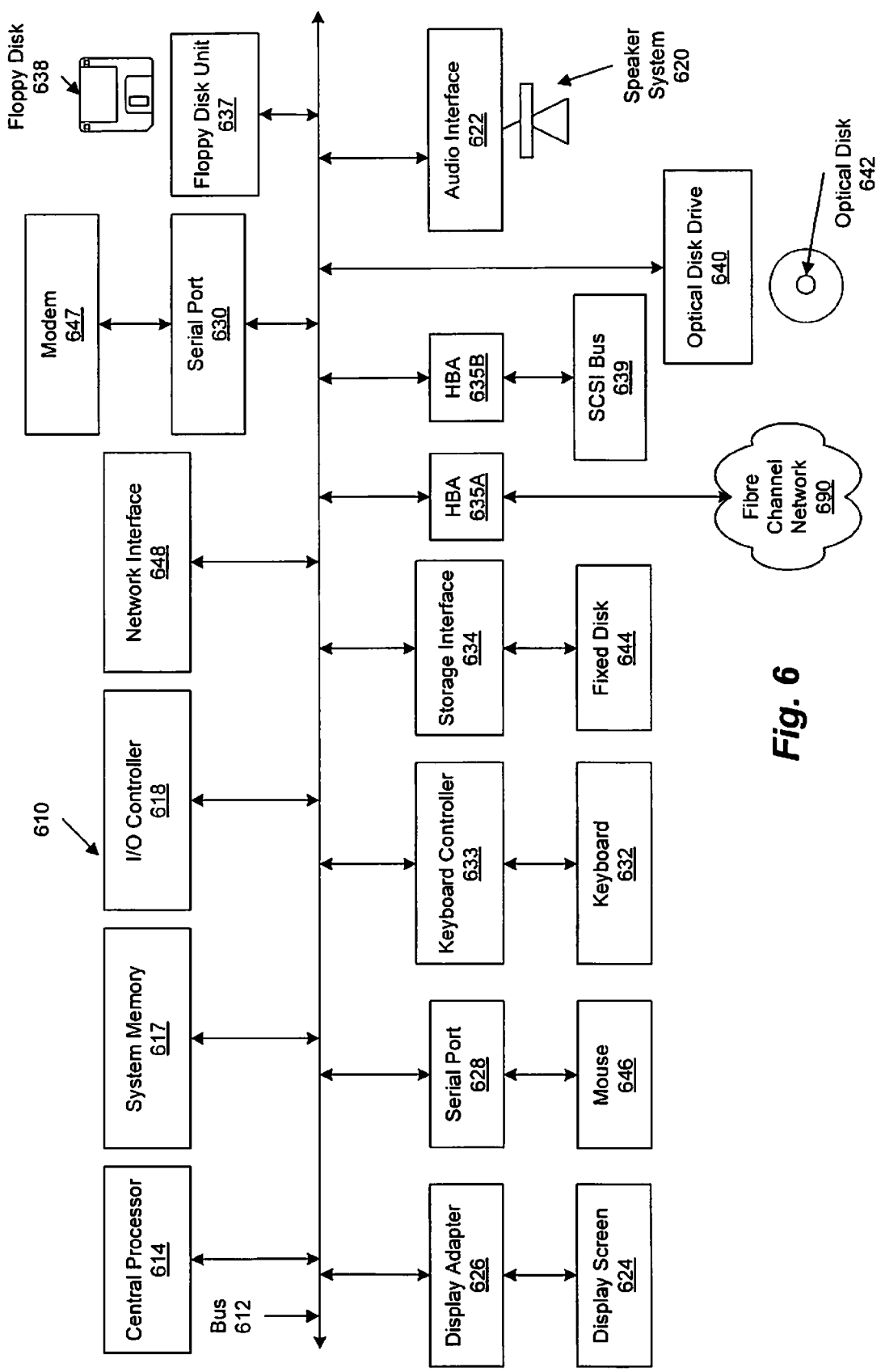
FIG. 6 is a simplified block diagram that illustrates an example of a computer system suitable for implementing embodiments of the present invention.

FIG. 6 depicts a block diagram of a computer system 610 suitable for implementing a server (e.g., server 115 of FIG. 1 and server 201 of FIG. 2), as well as the clients (e.g., clients 105(1)-105(N) of FIG. 1 and client 200 of FIG. 2) used therein. Computer system 610 includes a bus 612, which interconnects major subsystems of computer system 610, such as a central processor 614, a system memory 617 (typically random-access memory (RAM), but which may also include read-only memory (ROM), flash ROM, or the like), an input/output controller 618, an external audio device, such as speaker system 620 via an audio output interface 622, an external device, such as a display screen 624 via display adapter 626, serial ports 628 and 630, a keyboard 632 (interfaced with keyboard controller 633), a storage interface 634, a floppy disk drive 637 operative to receive a floppy disk 638, a host bus adapter (HBA) interface card 635A operative to connect with a Fibre Channel network 690, a host bust adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown) and random access memory (RAM) (not shown), as previously noted. RAM is generally the main memory into which operating system and application programs are loaded. ROM or flash memory can contain, among other code, the Basic Input-Output system (BIOS) which controls basic hardware operation such as the interaction with peripheral components. Applications resident with computer system 610 are generally stored on and accessed via a computer-readable medium, such as hard disk drive (e.g., fixed disk 644), an optical drive (e.g., optical drive 640), a floppy disk unit 637, or other storage medium.

Storage interface 634, as with other storage interfaces of computer system 610, can connect to a standard computer-readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a point-of-presence (POP). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present. The devices and subsystems can be interconnected in different ways from that shown in FIG. 6. The operation of the computer system such as that shown in FIG. 6 is readily known in the art and is not discussed in detail in this application. Code to implement the previously-described features can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or other known operating system.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method, implemented in a computer system, comprising:
   importing a first telephone number database from a first system into a second telephone number database stored on a second system, wherein
      the first system and the second system are located in geographically disparate regions,
      the first telephone number database comprises a plurality of telephone numbers,
      the importing comprises
         batch processing the plurality of telephone numbers, and
         generating a plurality of telephone number components by parsing the plurality of telephone numbers;
   in response to receiving a request for a telephone number of the plurality of telephone numbers at the computer system, generating, using one or more processors of the computer system, a ready-to-dial telephone number, wherein the generating comprises
      determining a geographic location from which the ready-to-dial telephone number is to be dialed,
      determining a target location of the telephone number,
      retrieving a first set of telephone number components of the plurality of telephone number components from the second telephone number database, wherein
         the first set of telephone number components comprise at least a part of the telephone number,
      retrieving a second set of telephone number components, wherein
         the second set of telephone number components are not part of the plurality of telephone number components, and
         one or more components of the second set of telephone number components are required to generate the ready-to-dial telephone number, and
      assembling components of the first set of telephone number components and components of the second set of telephone number components into the ready-to-dial telephone number; and
   in response to the generating, presenting the ready-to-dial telephone number to a user of the second system.

2. The method of claim 1, wherein
   the second set of telephone number components are retrieved from a metadata database,
   the target location is another geographic location to which the ready-to-dial telephone number is to be dialed from the geographic location,
   the request comprises one or more components of the first set of telephone number components, and
   the one or more components in the request are a subset of components in the ready-to-dial telephone number.

3. The method of claim 2, wherein
   the one or more components in the request are not consistent with a dialing plan for the location from which the ready-to-dial telephone number is to be dialed.

4. The method of claim 1, wherein the parsing further comprises:
   identifying a country code component in the telephone number by parsing a first character in the telephone number to identify a "+" character.

5. The method of claim 1, wherein the parsing further comprises:
  identifying a country code component in the telephone number by identifying an international access code component in the telephone number.

6. The method of claim 1, further comprising:
  validating a country code component of the telephone number using a telephone country code table;
  validating an area code component of the telephone number by
    determining that the area code component comprises only numbers,
    checking that a length of the area code component is greater than or equal to a first predetermined minimum length and less than or equal to a first predetermined maximum length, and
    checking the area code component using a table of area codes for a country identified by the country code component; and
  validating a subscriber number component of the telephone number by
    checking that the subscriber number component only comprises numbers, letters, and valid delimiters, and
    checking that a length of the subscriber number component is greater than or equal to a second predetermined minimum length and less than or equal to a second predetermined maximum length.

7. The method of claim 1, wherein the generating further comprises:
  comparing the geographic location from which the ready-to-dial telephone number is to be dialed and the target location of the telephone number;
  when the location from which the ready-to-dial telephone number is to be dialed and the target location are in different countries, generating the ready-to-dial telephone number by concatenating at least a country code component, a trunk prefix component, an area code component, and a subscriber number component of the first set of telephone number components;
  when the location from which the ready-to-dial telephone number is to be dialed and the target location are in different cities within a country, generating the ready-to-dial telephone number by concatenating at least the trunk prefix component, the area code component, and the subscriber number component; and
  when the location from which the ready-to-dial telephone number is to be dialed and the target location are in a same city, generating the ready-to-dial telephone number by retrieving at least the subscriber number component.

8. The method of claim 1, wherein the determining the geographic location from which the ready-to-dial telephone number is to be dialed comprises:
  determining the geographic location from which the request for the telephone number originated.

9. The method of claim 1, wherein the generating further comprises:
  prefacing the ready-to-dial telephone number with a code that specifies a particular long distance provider.

10. The method of claim 9, wherein
  the plurality of telephone number components comprises the code that specifies the particular long distance provider.

11. The method of claim 1, wherein the generating further comprises:
  when the geographic location from which the ready-to-dial telephone number is to be dialed and the target location are in a same city, generating the ready-to-dial telephone number by retrieving a subscriber number component, wherein
    the ready-to-dial telephone number does not comprise a country code component or a trunk prefix component.

12. The method of claim 1, wherein
  the plurality of telephone number components comprises a third set of telephone number components,
  the third set of telephone number components is associated with a subscriber,
  the third set of telephone number components comprises one or more of
    a country code associated with the subscriber,
    a trunk prefix associated with the subscriber,
    an area code associated with the subscriber,
    a subscriber number associated with the subscriber, or
    an international access code associated with the subscriber, and
  the generating comprises
    selecting, based on the request, the first set of telephone number components from the third set of telephone number components.

13. The method of claim 1, wherein presenting the ready-to-dial telephone number comprises at least one of:
  displaying the ready-to-dial telephone number,
  automatically dialing the ready-to-dial telephone number, or
  sending the ready-to-dial telephone number to a remote location via a messaging service.

14. The method of claim 1, wherein
  the first system is a first customer relationship management (CRM) system,
  the second system is a second CRM system,
  the first CRM system stores the plurality of telephone numbers in the first telephone number database, and
  and the plurality of telephone numbers are entered into the first telephone number database by a plurality of disparate persons at a plurality of disparate geographical locations.

15. The method of claim 1, wherein
  the plurality of telephone numbers are un-validated prior to being imported into the second telephone number database from the first telephone number database, and
  as a result of being un-validated, the telephone number of the plurality of telephone numbers is not the ready-to-dial telephone number from the geographic location.

16. A non-transitory computer program product comprising:
  a plurality of instructions comprising
  a first set of instructions, executable on a computer system, configured to
    import a first telephone number database from a first system into a second telephone number database stored on a second system, wherein the first system and the second system are located in geographically disparate regions,
    the first telephone number database comprises a plurality of telephone numbers,
    the importing comprises
      batch processing the plurality of telephone numbers, and
      generating a plurality of telephone number components by parsing the plurality of telephone numbers;
  a second set of instructions, executable on a computer system, configured to generate a ready-to-dial telephone number from a plurality of telephone number components, in response to receipt of a request for a telephone number of the plurality of telephone numbers, wherein the second set of instructions comprises
  a first subset of instructions, executable on the computer system, configured to determine a geographic location from which the ready-to-dial telephone number is to be dialed,
  a second subset of instruction, executable on the computer system, configured to determine a target location of the telephone number,
  a third subset of instructions, executable on the computer system, configured to retrieve a first set of telephone number components of the plurality of telephone number components from the second telephone number database, wherein
    the first set of telephone number components comprise at least a part of the telephone number,
  a fourth subset of instructions, executable on the computer system, configured to retrieving a second set of telephone number components, wherein
    the second set of telephone number components are not part of the plurality of telephone number components, and
    one or more components of the second set of telephone number components are required to generate the ready-to-dial telephone number, and
  a fifth subset of instructions, executable on the computer system, configured to assemble components of the first set of telephone number components and components of the second set of telephone number components into the ready-to-dial telephone number
  and
a third set of instructions, executable on the computer system, configured to present the ready-to-dial telephone number, in response to the generation of the ready-to-dial telephone number to a user of the second system; and
a non-transitory computer-readable storage medium, wherein the instructions are encoded in the non-transitory computer-readable storage medium.

17. The non-transitory computer program product of claim 16, wherein
  the second set of telephone number components are retrieved from a metadata database,
  the target location of the telephone number is another geographic location to which the ready-to-dial telephone number is to be dialed from the geographic location,
  the request comprises one or more components of the first set of telephone number components, and
  the one or more components in the request are a subset of components in the ready-to-dial telephone number.

18. The non-transitory computer program product of claim 16, wherein the plurality of instructions further comprise:
  a fourth set of instructions, executable on the computer system, configured to identify a country code component in the telephone number, wherein the fourth set of instructions is further configured to parse a first character in the telephone number to identify a "+" character.

19. The non-transitory computer program product of claim 16, wherein the plurality of instructions further comprise:
  a fifth set of instructions, executable on the computer system, configured to identify a country code component in the telephone number, wherein
    the fifth set of instructions is further configured to identify an international access code among the plurality of telephone number components.

20. The non-transitory computer program product of claim 16, wherein the instructions further comprise:
  a sixth set of instructions, executable on the computer system, configured to validate a country code component of the telephone number using a telephone country code table;
  a seventh set of instructions, executable on the computer system, configured to validate an area code component of the telephone number, wherein the seventh set of instructions comprises
    a first subset of instructions configured to determine that the area code component comprises only numbers,
    a second set of instructions configured to check that a length of the area code component is greater than or equal to a first predetermined minimum length and less than or equal to a first predetermined maximum length, and
    a third subset of instructions configured to check the area code component using a table of area codes for a country identified by the country code component; and
  an eighth set of instructions, executable on the computer system, configured to validate a subscriber number component of the telephone number, wherein the eighth set of instructions comprises
    a first subset of instructions configured to check that the subscriber number component only comprises numbers, letters, and valid delimiters, and
    a second subset of instructions configured to check that a length of the subscriber number component is greater than or equal to a second predetermined minimum length and less than or equal to a second predetermined maximum length.

21. The non-transitory computer program product of claim 16, wherein the plurality of instructions further comprise:
  a ninth set of instructions, executable on the computer system, configured to compare the location from which the ready-to-dial telephone number is to be dialed and the target location of the telephone number;
  a tenth set of instructions, executable on the computer system, configured to generate the ready-to-dial telephone number by concatenating at least a country code component, a trunk prefix component, a area code component, and a subscriber number component of the first set of telephone number components, when the location from which the ready-to-dial telephone number is to be dialed and the target location are in different countries;
  a eleventh set of instructions, executable on the computer system, configured to generate the ready-to-dial telephone number by concatenating at least the trunk prefix component, the area code component, and the subscriber number component, when the location from which the ready-to-dial telephone number is to be dialed and the target location are in different cities within a country; and
  a twelfth set of instructions, executable on the computer system, configured to generate the ready-to-dial telephone number by retrieving at least the subscriber number component, when the location from which the ready-to-dial telephone number is to be dialed and the target location are in a same city.

22. The non-transitory computer program product of claim 16, wherein the instructions further comprise:
  a thirteenth set of instructions, executable on the computer system, configured to determine
    the geographic location from which the request for the telephone number originated.

23. The non-transitory computer program product of claim 16, wherein the instructions further comprise:
a fourteenth set of instructions, executable on the computer system, configured to preface the ready-to-dial telephone number with a code that specifies a particular long distance provider.

24. An apparatus comprising:
importing means for importing a first telephone number database from a first system into a second telephone number database stored on a second system, wherein
the first system and the second system are located in geographically disparate regions,
the first telephone number database comprises a plurality of telephone numbers,
the importing comprises
batch processing the plurality of telephone numbers, and
generating a plurality of telephone number components by parsing the plurality of telephone numbers;
generating means for generating, in response to receiving a request for a telephone number of the plurality of telephone numbers, a ready-to-dial telephone number from a plurality of telephone number components, wherein the generating means comprises
first determining means for determining a geographic location from which the ready-to-dial telephone number is to be dialed,
second determining means for determining a target location of the telephone number,
a first retrieving means for retrieving a first set of telephone number components of the plurality of telephone number components from the second telephone number database, wherein
the first set of telephone number components comprise at least a part of the telephone number,
a second retrieving means for retrieving a second set of telephone number components, wherein
the second set of telephone number components are not part of the plurality of telephone number components, and
one or more components of the second set of telephone number components are required to generate the ready-to-dial telephone number, and
assembling means for assembling components of the first set of telephone number components and components of the second set of telephone number components into the ready-to-dial telephone number; and
presenting means for presenting, in response to an input from the generating means, the ready-to-dial telephone number to a user of the second system.

25. The apparatus of claim 24, wherein the apparatus further comprises:
means for comparing each component of the second set of telephone number components with known telephone number components stored in a metadata database, wherein the known telephone number components comprise at least one of
a country code,
a trunk prefix,
an area code,
a subscriber number,
an extension, and
an international access code.

* * * * *